R. TATTU.
CORNER JOINT FOR BEDSTEADS AND THE LIKE.
APPLICATION FILED OCT. 8, 1917.
1,337,626.
Patented Apr. 20, 1920.
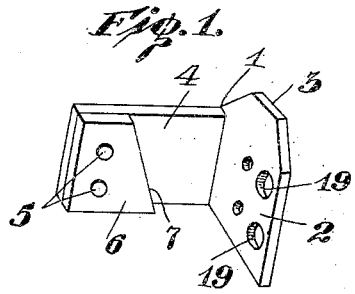
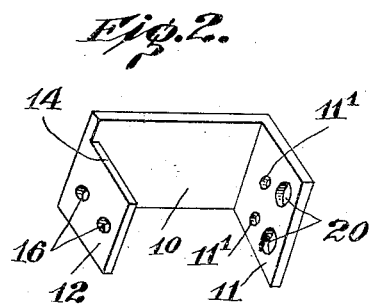
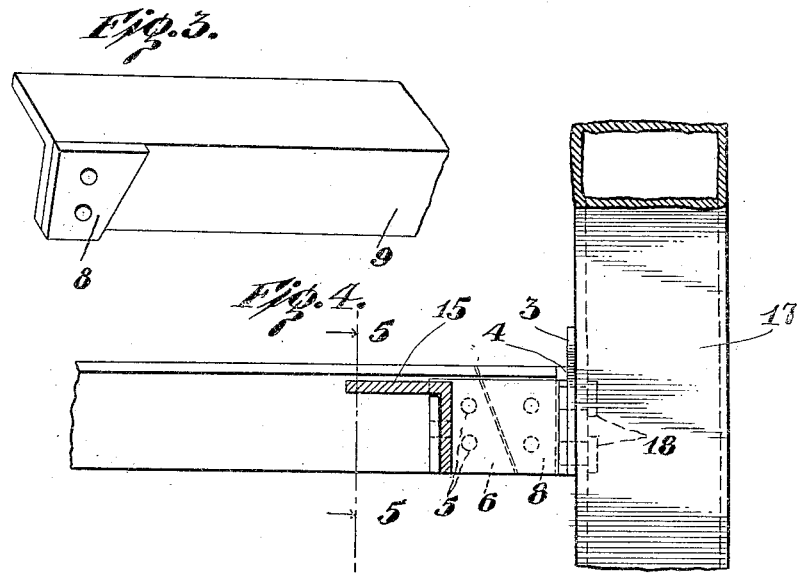
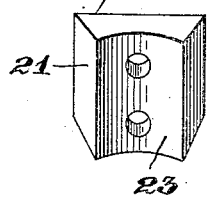
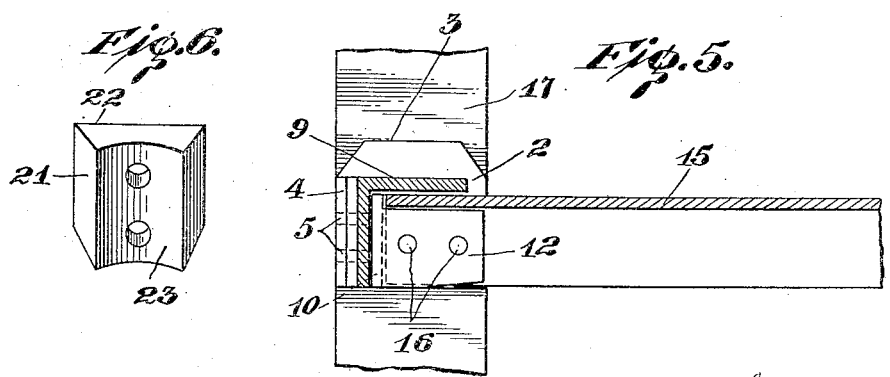

UNITED STATES PATENT OFFICE.

RADU TATTU, OF BROOKLYN, NEW YORK.

CORNER-JOINT FOR BEDSTEADS AND THE LIKE.

1,337,626.  Specification of Letters Patent.  Patented Apr. 20, 1920.

Application filed October 8, 1917. Serial No. 195,225.

*To all whom it may concern:*

Be it known that I, RADU TATTU, a citizen of the United States, residing at borough of Brooklyn, city of New York, county of Kings, and State of New York, have invented certain new and useful Improvements in Corner-Joints for Bedsteads and the like, of which the following is a specification.

My invention relates to improvements in corner joints for bedsteads and the like, and the object of my invention is to provide a cheap, rigid and efficient device for joining together the corners of bedsteads and the like.

I accomplish this object by the device illustrated in the accompanying drawings, in which—

Figure 1 is a view of the corner member,

Fig. 2 is a view of the bracket member,

Fig. 3 is a view of the side rail and block,

Fig. 4 is a view of the device assembled,

Fig. 5 is a view of the same on the line 5—5 in Fig. 4, and

Fig. 6 is a view of a pillow adapted to be used with a cylindrical post.

Similar characters refer to similar parts throughout the several views.

In my improved device, the corner 1 comprises two leaves 2 and 4 respectively, set at a right angle, the head leaf 2 is extended to form an upstanding shield 3 and the side leaf 4 carries on its inner face a block 6 which is secured upon the side leaf 4 by means of rivets 5 or in any suitable manner. The inner face 7 of the block 6, is cut diagonally and forms a tapered seat between the block 6 and the head leaf 2.

In the angle of the corner 1, I provide a bracket member 10 comprising a central section carrying a head leaf 11 and a rear leaf 12 set parallel to each other and at right angles to the central section. The head leaf 11 thereof is bound or secured within the angle of the corner 1 by means of rivets or the like inserted in the rivet holes 11¹ whereby the corner 1 and bracket member 10 are secured firmly together with the central section of the bracket member 10 lying parallel with the side leaf 4 of the corner 1 thus forming with the block 6 a tapered pocket to receive the vertical flange or lug 8 carried by the side rail 9 of a bedstead, the central section of the bracket member 10 being spaced from the block 6 to admit between them the vertical flange of the side rail.

The rear leaf 12 is preferably cut away at its upper marginal section 14 to form a seat for the end rail 15 of a bedstead which is secured thereto by means of rivets or the like inserted in the holes 16.

The device is attached to the bedpost 17 by means of suitable bolts or the like inserted in the holes 19 and 20 and anchored in the bedpost 17.

The corner 1 and bracket member 10 being riveted together as above described, will form, with the block 6, a seat for the lug 8 carried by the side rail 9 of the bedstead and the diagonally cut face 7 of the block 6 will tend to drive the lug 8, and the rail 9 upon which it is mounted, firmly against the inner face of the corner whereby a rigid union will be formed, and the shield 3 extending above the head leaf 2 will serve as a bearing for the top section of the rail 9 and also prevent it from scratching and marring the bedpost 17. It will be apparent that with this arrangement the side rails of the bedstead may be readily removed and replaced and the bedstead may be easily knocked down and assembled as desired.

The device as above described is more particularly adapted for use in bedsteads having posts of rectangular cross section and where it is desired to use it with bedposts of the pipe or cylindrical type, the outer face of the head leaf 2 may be cast or otherwise constructed to conform to the shape of the post or the pillow shown in Fig. 6 may be provided, comprising a block 21 having a flat face 22 to bear against the outer face of the head leaf 2 and a concave face 23 adapted to bear against the post of the bed. This pillow 21 is inserted between the head leaf 2 and the bedpost 17, and forms a firm and secure seat whereby the corner as above described may be used with any type of bedpost.

Having thus described my invention, what I claim is:

1. In a device of the character described, the combination of a corner member comprising a head leaf and a side leaf set at right angles to each other, an upstanding shield upon the head leaf, a block carried by the side leaf and having an inclined edge adapted to wedge a side rail, a bracket forming a pocket with the corner member and comprising a central section and two parallel leaves set at right angles to the central section, one of said leaves being bound to the head leaf of the corner member and the other of said leaves having its upper marginal edge cut away to form a seat for an end rail.

2. In a device of the character described, the combination of a corner member having a head leaf and a side leaf positioned at right angles to each other, a block carried by the side leaf and having an inclined edge adapted to wedge a side rail, a bracket member forming a pocket with the corner member and comprising a central section and two parallel leaves set at right angles to the central section, one of said leaves being bound to the head leaf of the corner member and the other of said leaves having its upper marginal edge cut away to form a seat for an end rail.

3. In a device of the character described, the combination of a corner member having a head leaf and a side leaf, a block carried by the side leaf and having an inclined edge adapted to wedge a side rail, a bracket member secured upon the corner member and forming a pocket therewith and spaced from the corner member to admit between them the vertical flange of a side rail.

4. In a device of the character described, the combination of a corner member having a head leaf and a side leaf, a block carried by the side leaf and having an inclined edge adapted to wedge a lug carried by a side rail, a bracket member secured upon the corner member and spaced therefrom to admit between them the vertical flange of said side rail.

5. In a device of the character described, the combination of a corner member adapted to be secured to a bedstead and having a projecting leaf, a block on said leaf and having an inclined edge adapted to wedge a lug carried by a side rail of the bedstead, and a bracket member having a leaf positioned parallel with the projecting leaf of the corner member and spaced therefrom to admit between them the vertical flange of the said side rail of the bedstead.

6. In a device of the character described, the combination of a corner member adapted to be secured to a bedpost and having a projecting leaf, a block on said leaf having an inclined edge adapted to wedge a lug carried by a side rail of a bedstead, a bracket member spaced upon the corner member, and a side rail having a flange seated between the projecting leaf of the corner member and the said bracket member and having a lug engaging the block carried by the projecting leaf of the corner member.

In testimony whereof I have signed my name to this specification, in the presence of two subscribing witnesses, this 30th day of August, 1917.

RADU TATTU.

Witnesses:
HARRY J. NEUSCHAFED,
MARCELLA J. PLESSER.